000
United States Patent
Skurkis et al.

(10) Patent No.: US 11,534,972 B2
(45) Date of Patent: Dec. 27, 2022

(54) POST-BUILD QUICK POWDER REMOVAL SYSTEM FOR POWDER BED FUSION ADDITIVE MANUFACTURING

(71) Applicant: GM Global Technology Operations LLC, Detroit, MI (US)

(72) Inventors: Richard J. Skurkis, Lake Orion, MI (US); Whitney A. Poling, Rochester Hills, MI (US); Mark A. Smith, Huntington Woods, MI (US); Tyson W. Brown, Royal Oak, MI (US); Md Ashabul Anam, Sterling Heights, MI (US); HyungMin Chae, Troy, MI (US); Blair E. Carlson, Ann Arbor, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 274 days.

(21) Appl. No.: 17/007,698

(22) Filed: Aug. 31, 2020

(65) Prior Publication Data
US 2022/0063198 A1    Mar. 3, 2022

(51) Int. Cl.
| | |
|---|---|
| *B29C 64/35* | (2017.01) |
| *B33Y 30/00* | (2015.01) |
| *B33Y 40/00* | (2020.01) |
| *B28B 17/04* | (2006.01) |
| *B28B 1/00* | (2006.01) |
| *B22F 10/00* | (2021.01) |
| *B29C 64/245* | (2017.01) |

(52) U.S. Cl.
CPC .............. *B29C 64/35* (2017.08); *B22F 10/00* (2021.01); *B28B 1/001* (2013.01); *B28B 17/04* (2013.01); *B29C 64/245* (2017.08); *B33Y 30/00* (2014.12); *B33Y 40/00* (2014.12)

(58) Field of Classification Search
CPC ........ B29C 64/35; B29C 64/357; B28B 17/04
See application file for complete search history.

(56) References Cited

U.S. PATENT DOCUMENTS

| | | | |
|---|---|---|---|
| 10,493,500 B2* | 12/2019 | Tafoya | B08B 3/10 |
| 10,596,626 B2 | 3/2020 | DeMuth et al. | |
| 10,610,904 B2* | 4/2020 | Tafoya | B08B 3/102 |
| 2002/0090410 A1* | 7/2002 | Tochimoto | B29C 64/357 425/215 |
| 2010/0126285 A1* | 5/2010 | Caroll | B65B 1/36 73/864.91 |
| 2014/0252685 A1 | 9/2014 | Stucker et al. | |
| 2016/0375469 A1* | 12/2016 | Tafoya | B33Y 40/00 134/18 |
| 2017/0036249 A1* | 2/2017 | Tafoya | B29C 64/35 |

(Continued)

*Primary Examiner* — Leith S Shafi
*Assistant Examiner* — Nicholas J Chidiac
(74) *Attorney, Agent, or Firm* — Vivacqua Crane, PLLC

(57) ABSTRACT

A post-build powder removal system includes a work bed, a platform wall having at least one powder evacuation port, and an evacuation port sealing system operable for selectively closing and opening the powder evacuation port. The platform wall cooperates with the work bed to define a powder chamber. The evacuation port sealing system includes an external sleeve slidingly fitted onto the exterior surface of the platform wall such that the external sleeve is slideable in a first direction closing the at least one powder evacuation port and slideable in an opposite second direction opening the at least one powder evacuation port.

4 Claims, 3 Drawing Sheets

(56) References Cited

U.S. PATENT DOCUMENTS

| | | | |
|---|---|---|---|
| 2017/0120536 A1* | 5/2017 | Brunermer | B29C 64/245 |
| 2021/0046703 A1* | 2/2021 | Hoppe | B29C 64/153 |
| 2021/0237357 A1* | 8/2021 | Van Brocklin | B29C 64/35 |
| 2022/0054967 A1* | 2/2022 | Mcmurtry | B29C 64/153 |
| 2022/0176454 A1* | 6/2022 | Beeby | B07B 7/06 |

* cited by examiner

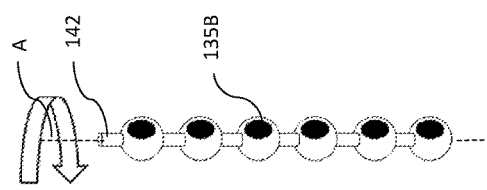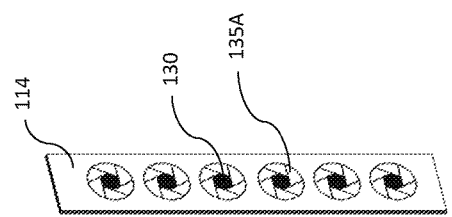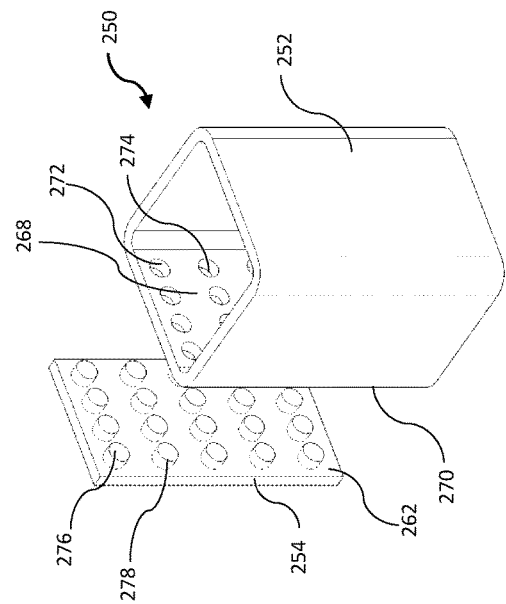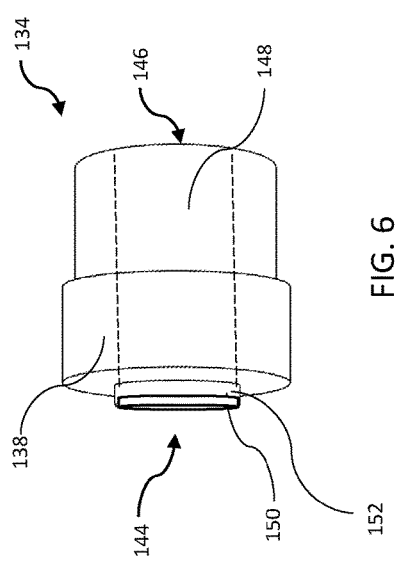
FIG. 3
FIG. 4
FIG. 5
FIG. 6
FIG. 7

POST-BUILD QUICK POWDER REMOVAL SYSTEM FOR POWDER BED FUSION ADDITIVE MANUFACTURING

INTRODUCTION

The present disclosure relates to powder bed fusion additive manufacturing, more particularly to a post-build powder removal system for powder bed fusion additive manufacturing.

Additive manufacturing can be used to create complex articles of manufacture from a wide variety of materials. Similar to 3-D printing, additive manufacturing typically involves sequential layer-by-layer addition of material to build an article of manufacture, such as a prototype or commercial automotive component. Such article of manufacture is also referred to as a 3-dimensional (3-D) part or simply as a part. Powder bed fusion is an additive manufacturing process used to make parts from metal, ceramic, polymer, and composite powder materials. Powder bed fusion is a process that induces fusion of powder material particles by exposing selected powder material particles to one or more focused thermal energy such as lasers, electron beams, and infrared energy.

The powder bed fusion process begins by applying a layer of powder material on a surface of a moveable build platform; applying a focused thermal energy onto the top layer of powder material in a 2 dimensional pattern that defines a layer of the part (part layer), thereby fusing the powder material into a solidified part layer; applying another layer of powder material onto the solidified part layer; and applying the focused thermal energy onto the another layer of the powder material in a pattern defining a another part layer. The process repeats until the layer-by-layer building of the 3-D part is completed. Each newly formed part layer is fused with the previously formed part layer forming a solid layered structure during the process. The fusion process may be that of solid-state sintering and/or by melting and solidification of the powder material.

Typically, the build platform includes a work bed having a work surface onto which the powder material layer is laid and a platform wall surrounding the work bed, thus defining a powder chamber to contain the powder material within the build platform. Once the build of the part is completed, there remains a quantity of loose non-fused powder material on the completed 3-D part and in the powder chamber. The remaining non-fused powder material is typically removed by manually sweeping, vacuuming, and/or inverting the build platform. While manually sweeping and vacuuming serve the intended purpose, it is labor intensive and time consuming, especially for delicate 3-D parts where care must be used to avoid damaging the newly formed 3-D part.

Thus, there is a need for a post-build powder removal system for removing non-fused powder from the build platform that is less labor and time intensive while minimizing potential damage to the newly build 3-D part, as well as minimizing any potential hazards associated with loose powder material.

SUMMARY

According to several aspects, a post-build powder removal system for a powder bed fusion system is disclosed. The post-build powder removal system includes a work bed, a platform wall having at least one powder evacuation port, and an evacuation port sealing system for selectively closing and opening the powder evacuation port. The platform wall cooperating with the work bed to define a powder chamber. The platform wall includes an interior surface, an exterior surface opposite the interior surface, and at least one port surface extending from the interior surface to the exterior surface to define the least one powder evacuation port in fluid communication with the powder chamber.

In an additional aspect of the present disclosure, the evacuation port sealing system includes an external sleeve slidingly fitted onto the exterior surface of the platform wall such that the external sleeve is slideable in a first direction closing the at least one powder evacuation port. The external sleeve is also slideable in an opposite second direction opening the at least one powder evacuation port.

In another aspect of the present disclosure, the external sleeve includes an interior surface, an exterior surface opposite the interior surface, and at least one aperture surface defining an aperture extending from the interior surface to the exterior surface of the external sleeve. The interior surface of the external sleeve is in sliding contact with the exterior surface of the platform wall. The external sleeve is slideable in the first direction such that a portion of the external sleeve seals the at least one evacuation port, thus closing the at least one evacuation port, and in the second direction such that the at least one aperture of the sleeve is in alignment with the at least one powder evacuation port of the platform wall, thus opening the at least one evacuation port.

In another aspect of the present disclosure, the platform wall and the external sleeve extend along an axis. The external sleeve is axially slideable in the first direction along the axis and axially slideable in an opposite second direction along the axis.

In another aspect of the present disclosure, the platform wall and the external sleeve extend along an axis. The external sleeve is rotatably slideable in the first direction about the axis and rotatably slideable in an opposite second direction about the axis.

In another aspect of the present disclosure, the evacuation port sealing system includes a sealing plate having an interior surface having at least one sealing plug configured to be insertable into and seal evacuation port when the interior surface of the sealing plate is engaged to the exterior surface of the platform wall.

In another aspect of the present disclosure, the evacuation port sealing system for selectively closing and opening the powder evacuation port includes at least one of an iris valve and a ball valve disposed within the at least one evacuation port.

In another aspect of the present disclosure, the post-build powder removal system further includes an evacuation fitting disposed on an exit side of the evacuation port. The evacuation fitting includes a vibration motor configured to transmit vibrations through the evacuation fitting and the platform wall.

In another aspect of the present disclosure, the post-build powder removal system further includes a perforated screen disposed on an inlet side of the evacuation port. The perforated screen defines openings sufficiently large such that loose non-fused powder material is capable of passing through, but sufficiently small such that a post-build part is incapable of passing through.

In another aspect of the present disclosure, the post-build powder removal system further includes at least one of a moveable brush and a pressurized air source configured to selectively remove loose powder material from a post-build part.

According to several aspects, a platform wall assembly for a post-build powder removal system is disclosed. The platform wall assembly includes a platform wall having an interior surface, an exterior surface opposite the interior surface, and at least one port surface extending from the interior surface to the exterior surface to define at least one powder evacuation port; and a sleeve having an interior surface, an opposite exterior surface, and an aperture surface extending from the interior surface to the exterior surface to define at least one aperture. The sleeve is slidingly fitted onto the platform wall such that the interior surface of the sleeve is slideable against the exterior surface of the platform wall in a first direction to a close position, such that a portion of the sleeve seals the at least one evacuation port, and in an opposite second direction to an open position, such that the at least one aperture is aligned with the at least one evacuation port.

In an additional aspect of the present disclosure, the platform wall includes a cylindrical exterior surface extending along an axis and the sleeve includes a cylindrical interior surface extending along the axis. The cylindrical interior surface of the sleeve is selectively rotatably slideable on the cylindrical exterior surface of the platform wall about the axis in the first and second directions.

In another aspect of the present disclosure, the at least one evacuation port and the at least one aperture include an elongated slot profile extending along the axis.

In another aspect of the present disclosure, the platform wall includes an exterior surface extending along an axis and the sleeve includes an interior surface extending along the axis. The interior surface of the sleeve is selectively axially slideable on the exterior surface of the platform wall along the axis in the first and second directions.

In another aspect of the present disclosure, the build platform wall assembly further includes a perforated screen disposed in the evacuation port and an evacuation fitting disposed in the aperture.

According to several aspects, a build platform for a post-build powder removal system is disclosed. The build platform includes a work bed and a platform wall cooperating with the work bed to define a powder chamber. The platform wall includes an interior surface, an exterior surface opposite the interior surface, and at least one port surface extending from the interior surface to the exterior surface to define at least one powder evacuation port in fluid communication with the powder chamber. A valve is disposed within the at least one evacuation port.

In an additional aspect of the present disclosure, the build platform further includes an evacuation fitting disposed in an outlet side of the at least one evacuations port. The evacuation fitting includes an annular vibration motor configured to transmit vibrations through the evacuation fitting and the platform wall.

In another aspect of the present disclosure, the build platform further includes a perforated screen disposed in an inlet side of the at least one evacuation port.

In another aspect of the present disclosure, the build platform further includes a moveable brush and a directionally targetable pressurized gas source.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is an illustration of a mesh screen for the powder bed fusion system of FIG. 1;

FIG. 4 is a perspective illustration of a portion of a platform wall having iris valves for the powder bed fusion system of FIG. 1, according to an exemplary embodiment;

FIG. 5 is a perspective illustration of an assembly of ball valves for the powder bed fusion system of FIG. 1, according to an exemplary embodiment;

FIG. 6 is a perspective illustration of a powder evacuation fitting for the powder bed fusion system of FIG. 1, according to an exemplary embodiment;

FIG. 7 is a perspective illustrations of an alternative embodiment of a platform wall assembly having selectively sealable powder evacuation ports, according to an exemplary embodiment;

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
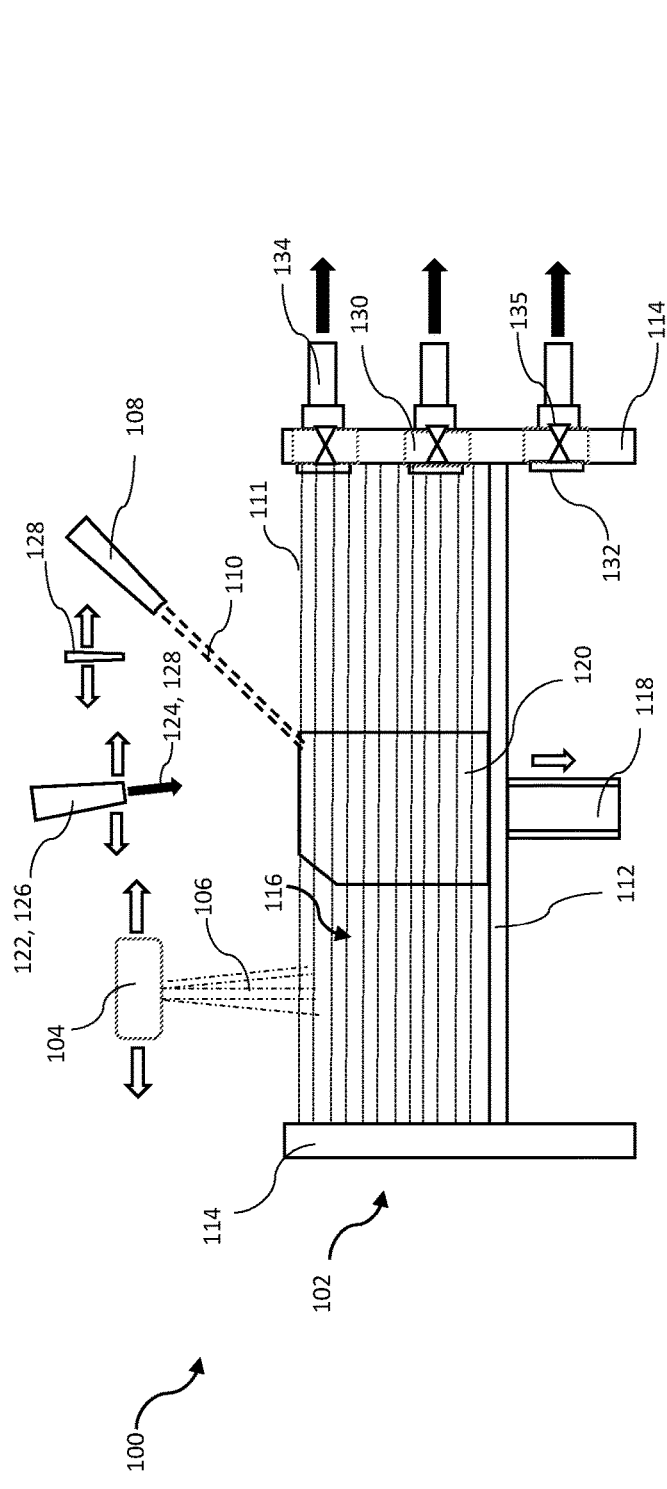
FIG. 1 is a diagram illustrating a cut-away side view of a powder bed fusion system having a post-build powder removal system, according to an exemplary embodiment.

FIG. 1 shows a schematic illustration of a powder bed fusion system 100 having a build platform 102, a powder material dispenser 104 configured to dispense layers of powder material 106 into the build platform 102, and an energy source 108 configured to direct and guide a focused thermal energy 110 through predetermined 2-D patterns onto a top layer 111 of the powder material 106 in the build platform 102. The powder material dispenser 104 is capable of adjusting the thicknesses of the various layers of powder material 106 as well as grading and removing the powder material 106. Powder materials may include, but is not limited to, metal, ceramic, glass, polymeric powders, other meltable material capable of undergoing a thermally induced phase change from solid to liquid and back again, or combinations thereof. The energy source 108 may include, but is not limited to, lasers, electron beams, infrared energy, and micro-wave energy capable of melting, fusing, sintering, amalgamating, and/or otherwise chemically or physically modifying the dispensed powder material 106 to form a solid structure part 120.

The build platform 102 includes a work bed 112 and a platform wall 114 surrounding the work bed 112 to define a powder chamber 116, generally indicated by reference number 116, for containing the powder material 106 dispensed by the powder dispenser 104. The build platform 102 further includes an actuator 118 engaged to the work bed 112 for selectively moving the work bed 112 apart from the focus energy source 108 at incremental distances equal to the thickness of a layer of powder dispensed by the powder dispenser 104, while the platform wall 114 remains in a fixed position.

The powder material dispenser 104 is selectively moveable across the powder chamber 116 to distribute sequential layers 111 of powder material 106 into the powder chamber 116 and includes a re-coater blade (not shown). For each layer of distributed powder material 106, the re-coater blade sweeps away any excess powder into an overflow opening (not shown), thereby forming a thin uniformed thickness layer 111 of powder material 106 substantially flush with the top surface of the platform wall 114.

The powder bed fusion system 100 further includes an inert gas source 122 configured to supply an inert atmosphere 124 into the work chamber 116 to reduce unwanted chemical interactions as well as to mitigate the risks of fire or explosion, especially with reactive powdered metals. The inert gas is supplied into the work chamber 116 prior to and as the powder material 106 is dispensed into the powder chamber 116 by the powder material dispenser 104. The inert gas source 122 is further configured to supply an inert gas stream 128 to aid the evacuation of the loose powder material 106 from the powder chamber 116 and remove loose powder material 106 from the post-build part, which is disclosed in detail below.

The powder bed fusion system 100 includes a post-build powder removal system for the removal of non-fused powder material 106, also referred to as loose powder material 106, from the powder chamber 116 after the completion of a build of a part. The post-build powder removal system includes a directionally targetable pressurized gas source 126, a moveable brush 128, a plurality of powder evacuation ports 130 defined through the platform wall 114, a plurality of perforated screens 132 covering an inlet side of the evacuation ports 130, a plurality of powder evacuation fitting 134 engaged to an opposite side of the powder evacuation ports 130, and valves 135 or other evacuation port sealing systems or devices for selectively closing and opening the powder evacuation ports 130. The evacuation ports 130 are in fluid communication with the powder chamber 116. The evacuation ports 130 are closed, also referred to as sealed, during the building of the part and are opened, also referred to unsealed, for the removal of unfused powder materials post-build of the part.

The pressurized gas source 126 is configured to selectively targeted short-bursts, or puffs, of pressurized gas on and around a newly build 3-D part, also referred to as post-build part, by blowing away small amounts of loose powder material 106 that are trapped in crevices of the post-build part. The pressurized gas source 126 may also function as the inert gas source 122 as opposed to having a separate inert gas source 122. The moveable brush 128 is connected to a gantry system (not shown) for guiding the moveable brush 128 to clear loose powder material 106 from the post build 3-D part.

Figure 2:
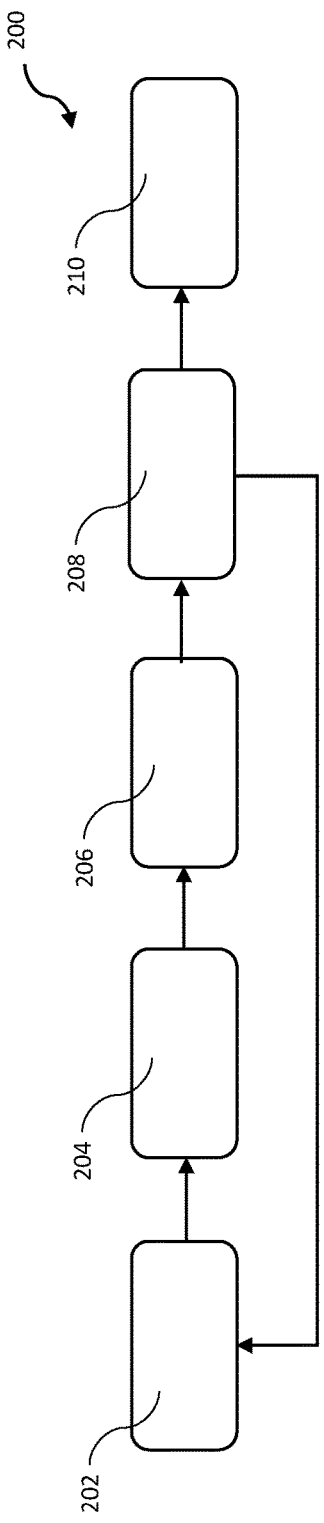
FIG. 2 is a block diagram illustrating a process of operating a powder bed fusion system of FIG. 1, according to an exemplary embodiment.

FIG. 2 is a flow chart 200 illustrating the process of the powder bed fusion system 100 shown in FIG. 1. In step 202, the powder evacuation ports 130 are set in the closed position (sealed position), a blanket of inert gas is introduced into the powder chamber 116, and a layer of powder material 106 is dispersed onto the work bed 112 in the powder chamber 116 of the build platform 102. In step 204, the energy source 108 directs a focused thermal energy 110 onto the top layer of powder material 106 and guides the focused thermal energy 110 through a predetermined 2-dimensional (2-D) pattern. The focused thermal energy 110 fuses a portion of powder material 106 defined by the 2-D pattern into a layer of a solid 3 dimensional (3-D) part that is being built.

In step 206, the work bed 112 is spaced from the thermal source at a predetermined distance that is substantially equal to the thickness of the next layer of the 3-D part that is being built. Another layer of powder material 106 is dispersed into the powder chamber 116 on top of the previous layer. In step 208 the focused thermal energy 110 is directed onto the new layer of the powder material 106 in another predetermined 2-D pattern, thereby forming another layer of the 3-D part onto the previously formed layer. Each newly formed 3-D part layer is fused with the previously formed 3-D part layer to form a solid 3-D layered structure 120. The process of steps 202 through 208 are repeats until the layer-by-layer building of the 3-D part 120 is completed.

In step 210, after the build of the 3-D part is completed, also referred to as post-build, the powder evacuation ports 130 are set in the open position (unsealed position). The pressurized gas source 126 directs a stream of pressurized gas into one portion of the powder chamber 116 while a vacuum is applied to the open powder evacuation ports 130 at another portion of the powder chamber 116 opposite the first portion. It is preferable the stream of pressurized gas is directed onto the work bed 112 in the general direction of the powder evacuation ports 130 and selectively target onto the post-build part in short bursts. The difference in pressure between the powder chamber 116 and vacuum, together with the kinetic energy of the stream of pressurized air, urges the loose non-fused powder material 106 to evacuate the powder chamber 116 through the powder evacuation ports 130. The extracted non-fuse powder may be collected in a downstream suitable filter or cyclone collector (not shown). Once the loose non-fused powder material 106 is removed from the powder chamber 116 exposing the 3-D part, the brush 128 moves in a predetermined pattern based on the geometry of the part to remove loose powdered materials form the surface of the 3-D part.

FIG. 3 shows an exemplary perforated screen 132 disposed in the powder evacuation port 130, preferably upstream of the valves 135. The shown exemplary perforated screen 132 is that of a mesh type screen, but it is not intended to be interpreted as to be limited to that of a mesh type screen. The openings 133 defined by the perforated screen 132 are sufficiently large such that loose non-fused powder material 106 is capable of passing through the perforated openings 133, but the openings 133 are sufficiently small such that the post-build part and fused powder material 106 are not capable of passing through.

Now referring to FIG. 4, shown is a perspective illustration of a portion of the platform wall 114 of FIG. 1. The platform wall 114 includes a plurality of powder evacuation ports 130. An iris valve 135A, also known as an aperture valve 135A, is inserted into each of the powder evacuation ports 130 for selectively opening and closing the powder evacuation ports 130. The iris valve 135A may be selectively opened and closed by an electric or manual actuator (not shown).

Now referring to FIG. 5, shown is a perspective illustration of an assembly of ball valves 135B for selectively opening and closing the powder evacuation ports 130. The ball valves 1356 are aligned and rotatable on an axis A between a close position and an open position. The ball valves 135B are inserted into a vertical column or a horizontal row of corresponding powder evacuation ports 130 in the platform wall 114. A single valve shaft 142 extends through the arrangement of ball valves 135B along the Axis-A. A torque force may be manually or electronically applied onto the valve shaft 142 for selectively opening and closing the ball valves 135B. The arrangement of ball valves 135B may be used in conjunction with iris valves 135A for fine control of the evacuation of loose non-fused powder from the powder chamber 116.

Referring to FIG. 6 is a perspective illustration of a powder evacuation fitting 134 for engaging the powder evacuation ports 130 of FIG. 1. The powder evacuation fitting 134 includes a first end 144, an opposite second end 146, and a passageway 148 extending there-through between the first end 144 and second end 146. The first end 144 includes a coupling 150 having an elastomer compression seal 152 insertable into the exit side of the evacuation port 130. The second end is configured to be connectable to a vacuum pump (not shown). The powder evacuation fitting 134 also includes an annular vibration motor 138 capable of inducing vibrations that are transmitted through the powder evacuation fitting 134 and platform wall 114 via the evacuation port 130 to reduce the amount of non-fused powder material 106 from settling in the evacuation ports 130 and evacuation fittings 134. The vibrations facilitate the loosening of layers powder material 106 that may have formed a packed powder cake during the build process, thereby shortening the time required to evacuate powder material 106 from the powder chamber 116.

FIG. 7 is a perspective illustrations of an exemplary embodiment of a platform wall assembly 250 configured to selectively open and close the powder evacuation ports 274 without the need for valves. For clarity of illustration, the work bed 112 and other features of the powder bed fusion system 100 are not shown. The platform wall assembly 250 includes a platform wall 252 and a sealing plate 254 that is removable from a side of the platform wall 252. The platform wall 252 includes an interior surface 268, an opposite exterior surface 270, and a plurality of port surfaces 272 defining a plurality of evacuation ports 274 extending therebetween the interior surface 268 and exterior surface 270.

The sealing plate 254 includes an interior plate surface 262 having a plurality of protruding plugs 276 that are complementary in shape and size with the evacuation ports 274 such that the plurality of plugs 276 are insertable into the evacuation ports 274, thereby closing the evacuation ports 274 when the interior plate surface 262 of the sealing plate 254 is engaged to the exterior surface 270 of the platform wall 252. Elastomer seals 278 are provided on the plugs 276 to provide a seal between the plugs 276 and ports 274. While the plugs 276 and ports 274 are shown to be circular, it should be appreciated that it is not intended to be so limited and may include any shapes that are complementary to one another to provide a sealed powder evacuation port 274 when the sealing plate 254 is engaged to the platform wall 252.

Figure 8A:
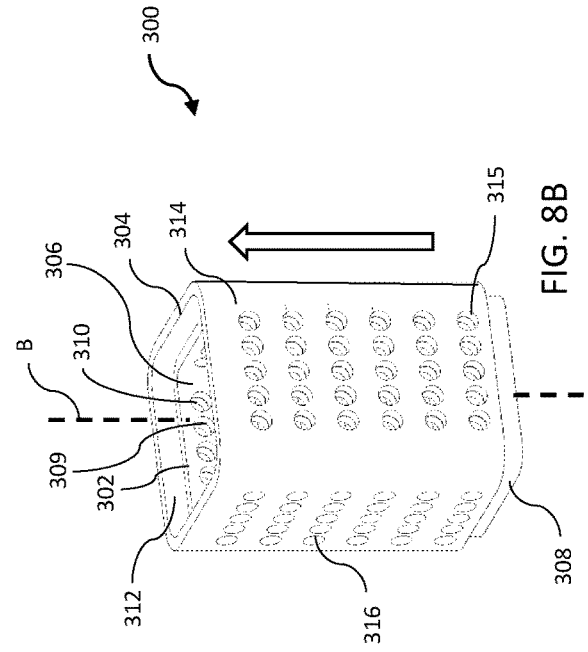
FIGS. 8A and 8B are perspective illustrations of another embodiment of a platform wall assembly having selectively sealable powder evacuation ports, according to an exemplary embodiment.
Figure 8B:
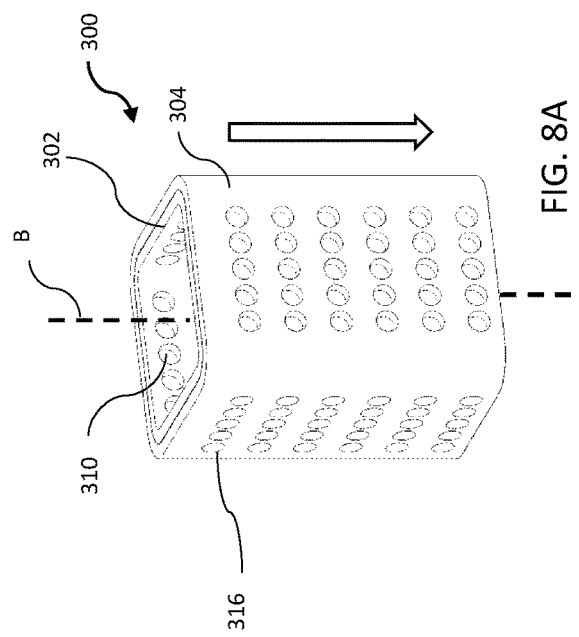

FIGS. 8A and 8B are perspective illustrations of another exemplary embodiment of a platform wall assembly 300 configured to selectively open and close the powder evacuation ports 310 without the need for valves. The platform wall assembly 300 includes a platform wall 302 and external sleeve 304, also referred to as an external shell 304, which is slideable against the platform wall 302 along the Axis B. Best shown in FIG. 8B, the platform wall 302 includes an interior surface 306, an opposite exterior surface 308, and a plurality of port surfaces 309 defining a plurality of evacuation ports 310 extending therebetween the interior surface 306 and exterior surface 308. The external sleeve 304 includes an interior surface 312, an opposite exterior surface 314, and a plurality of opening surfaces 315, also referred to aperture surfaces 315, defining a plurality openings 316, also referred to as apertures 316, extending therebetween the interior surface 312 and exterior surface 314 of the external sleeve 304.

Referring to both FIG. 8A and FIG. 8B, the external sleeve 304 is slidingly disposed onto the platform wall 302 such that the interior surface 312 of the external sleeve 304 is in direct slideable contact with the exterior surface 308 of the platform wall 302. The openings 316 of the external sleeve 304 are complimentary in location, shape, and size as that of the powder evacuation ports 310 of the platform wall. Referring to FIG. 8A, in a closed position, also referred to as a first position, the external sleeve 304 blocks the powder evacuation ports 310 of the platform wall 302 when one of the platform wall 302 and the external sleeve 304 is slid along the Axis-B in a first direction. One of the platform wall 302 and the external sleeve 304 means either the platform wall 302 or the external sleeve 304. Referring to FIG. 8B, in the open position, also referred to as a second position, the openings 316 of the external sleeve 304 are in alignment with the powder evacuation ports 310 of the platform wall 302 when the one of the platform wall 302 and the sleeve 304 is slid along the Axis-B in a second direction opposite that of the first direction.

For example, the powder evacuation ports 310 are in a closed sealed position when the external sleeve 304 is slid in one axial direction, as shown in FIG. 8A, and are in an open unsealed position when the sleeve 304 is slid along the platform wall 302 in an opposite axial direction, as shown in FIG. 8B. It is appreciated that while the powder evacuation ports 310 and openings 316 are shown as having round profiles, it is not intended to be so limited. The powder evacuation ports 310 and openings 416 are sized to allow for the evacuation of loose powder material 106 from the powder chamber 116.

Figure 9A:
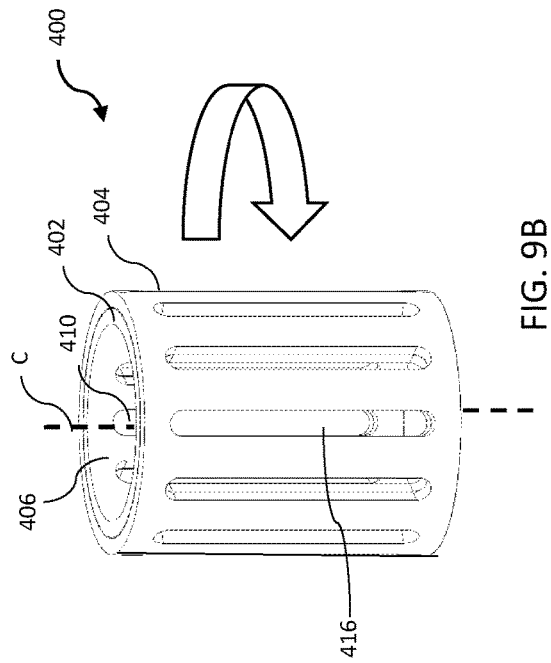
FIGS. 9A and 9B are perspective illustrations of yet another embodiment of a platform wall assembly having selectively sealable powder evacuation ports, according to an exemplary embodiment.
Figure 9B:
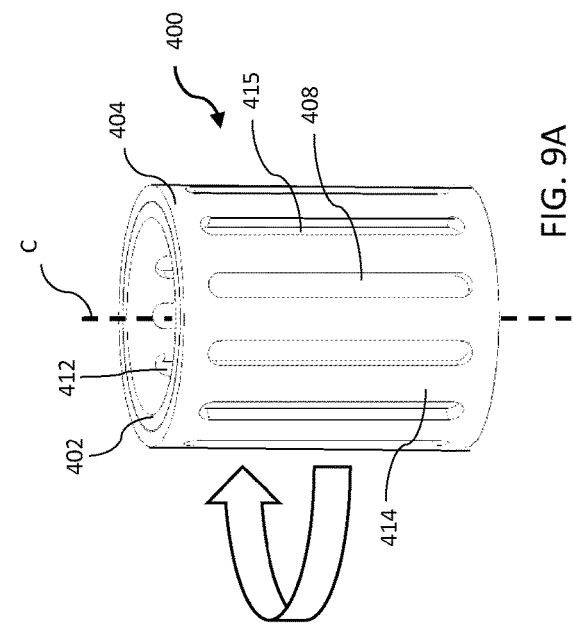

FIGS. 9A and 9B are perspective illustrations of yet another exemplary embodiment of a platform wall assembly 400 configured to selectively open and close the powder evacuation ports 410 without the need for valves. The platform wall assembly 400 includes a cylindrical platform wall 402 and external cylindrical sleeve 404, or shell 404, which is rotatably slideable against the cylindrical platform wall 402 about the Axis-C. The cylindrical platform wall 402 includes an interior surface 406, an opposite exterior surface 408, and defines a plurality of axially elongated evacuation ports 410 extending therebetween the interior surface 406 and exterior surface 408. The exterior cylindrical sleeve 404 includes an interior surface 412, an opposite exterior surface 414, and a plurality of slot surfaces 415 defining a plurality of slot openings 416 extending therebetween the interior surface 412 and exterior surface 414.

Referring to both FIG. 9A and FIG. 9B, the external sleeve 404 is slidingly disposed onto the platform wall 402 such that the interior surface 412 of the external sleeve 404 is in direct slideable contact with the exterior surface 408 of the platform wall 402 along the Axis-C. The elongated openings 416 of the sleeve 404 are complimentary in location, shape, and size as that of the powder evacuation ports 410 of the platform wall. Referring to FIG. 9A, in the closed position, the sleeve 404 blocks the powder evacuation port 410 of the platform wall 402 when one of the platform wall 402 and external sleeve 404 is rotated about the Axis-C in one direction. One of the platform wall 402 and external sleeve 404 means either the platform wall 402 or the external sleeve 404. Referring to FIG. 9B, in the open position, the slot openings 416 of the sleeve 404 are in alignment with the powder evacuation port 410 of the platform wall 402 when the one of the platform wall 402 and external sleeve 404 is rotated about the Axis-C in the opposite direction.

For example, the powder evacuation ports 410 are closed when the external sleeve 404 is rotated in one axial direction, as shown in FIG. 9A, and are opened when the external sleeve 404 is rotated an opposite axial direction, as shown in FIG. 9B. It is appreciated that while the powder evacuation ports 410 and openings 416 are shown as having an elongated slot profiles, it is not intended to be so limited. The powder evacuation ports 410 and openings 416 are sized to allow for the evacuation of non-fused powder material 106 from the powder chamber 116.

The post-build powder removal system disclosed above vents excess loose powder material 106 quickly once the build has been completed. The platform wall have powder evacuation ports to allow excess loose powder to flow freely out of the powder chamber 116. The powder evacuation ports are closed off during the build process to seal the powder chamber 116 area and are opened in post-build to remove excess loose powder.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A post-build powder removal system for a powder bed fusion system, comprising:
   a build platform including:
      a work bed;
      a platform wall cooperating with the work bed to define a powder chamber, wherein the platform wall includes an interior surface, an exterior surface opposite the interior surface, and at least one port surface extending from the interior surface to the exterior surface to define at least one powder evacuation port in fluid communication with the powder chamber; and
      an evacuation port sealing system operable for selectively closing and opening the powder evacuation port;
   wherein the evacuation port sealing system includes:
   an external sleeve slidingly fitted onto the platform wall such that one of the platform wall and external sleeve is slideable in a first direction closing the at least one powder evacuation port and slideable in an opposite second direction opening the at least one powder evacuation port; and
   wherein the external sleeve includes:
      an interior surface, an exterior surface opposite the interior surface, and at least one aperture surface defining an aperture extending from the interior surface to the exterior surface of the external sleeve,
   wherein the interior surface of the external sleeve is in sliding contact with the exterior surface of the platform wall, and
   wherein the external sleeve is slideable in the first direction sealing the at least one powder evacuation port, thus closing the at least one powder evacuation port, and in the second direction aligning the at least one aperture of the sleeve with the at least one powder evacuation port of the platform wall, thus opening the at least one powder evacuation port.

2. The post-build powder removal system of claim 1, wherein:
   the platform wall and the external sleeve extend along an axis; and
   the external sleeve is axially slideable in the first direction along the axis and axially slideable in the second direction opposite the first direction along the axis.

3. The post-build powder removal system of claim 1, wherein:
   the platform wall and the external sleeve extend along an axis; and
   the external sleeve is rotatably slideable in the first direction about the axis and rotatably slideable in the second direction opposite the first direction about the axis.

4. A post-build powder removal system for a powder bed fusion system, comprising:
   a build platform including:
      a work bed;
      a platform wall cooperating with the work bed to define a powder chamber, wherein the platform wall includes an interior surface, an exterior surface opposite the interior surface, and at least one port surface extending from the interior surface to the exterior surface to define at least one powder evacuation port in fluid communication with the powder chamber; and
      an evacuation port sealing system operable for selectively closing and opening the powder evacuation port;
   wherein the evacuation port sealing system includes a sealing plate having an interior plate surface having at least one protruding sealing plug configured to be insertable into and sealing the at least one powder evacuation port when the interior plate surface of the sealing plate is engaged to the exterior surface of the platform wall.

\* \* \* \* \*